Jan. 28, 1936. B. L. McKINSTRY Re. 19,838

FRUIT PRESS

Original Filed Aug. 1, 1931 3 Sheets-Sheet 1

INVENTOR

BY B. L. McKinstry

Fred P. Fosse

ATTORNEY

Jan. 28, 1936. B. L. McKINSTRY Re. 19,838

FRUIT PRESS

Original Filed Aug. 1, 1931 3 Sheets-Sheet 2

INVENTOR

BY B. L. McKinstry

Fred P. Lane

ATTORNEY

Jan. 28, 1936. B. L. McKINSTRY Re. 19,838

FRUIT PRESS

Original Filed Aug. 1, 1931 3 Sheets-Sheet 3

INVENTOR
B. L. McKinstry
BY Fred P. Lorenz
ATTORNEY

Reissued Jan. 28, 1936 Re. 19,838

UNITED STATES PATENT OFFICE 19,838

FRUIT PRESS

Bruce L. McKinstry, Entiat, Wash.

Original No. 1,888,281, dated November 22, 1932, Serial No. 554,560, August 1, 1931. Application for reissue November 7, 1934, Serial No. 751,916

12 Claims. (Cl. 100—50)

This invention relates to cider presses, designed primarily for producing cider on order.

An object of the invention is to provide a press of compact form so that it may be readily set up in a convenient place to press the apples and produce cider in the presence of the customer, and to insure, to the satisfaction of the customer, that the cider is fresh.

A further object of the invention is to provide a cider press capable of being set up and so arranged that a customer may select the apples and see to it the apples selected are put in the press and the cider made fresh while he waits.

A press constructed and arranged as outlined not only insures of fresh, sweet cider, but prevents the dealer passing off stale cider for fresh, as the whole operation is carried on in the presence of the customer.

The invention also comprehends improvements in the details of construction and arrangement of parts which will be hereinafter described and pointed out in the claims.

Figure 1:
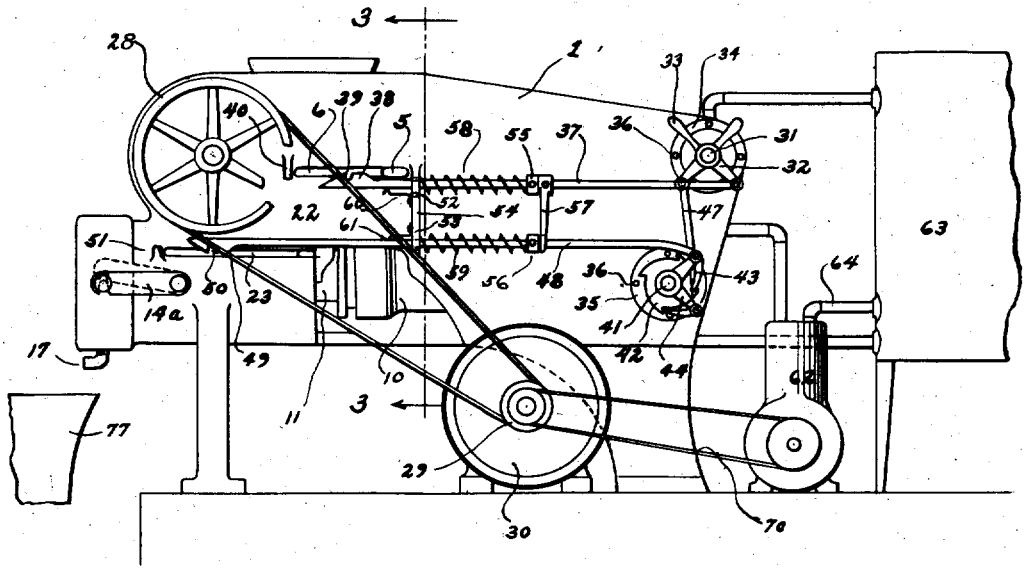
Figure 1 is a side elevation of the cider press.

Referring now more particularly to the drawings, numeral 1 indicates the frame of the press; 2 a hydraulic cylinder which may be formed integrally with the frame or otherwise secured thereto. A piston 3 operates in the cylinder 2, and to the outer end of the piston is secured a push block 4. Extending from one side of the block 4 is a lug 5 which projects through a slot 6 in the side of the frame, as shown in Figure 1.

Mounted on the frame is a rotary valve 7 formed with ports 8 and 9 for supplying and exhausting oil to and from the cylinder 2. A second hydraulic cylinder 10 is mounted on the frame and operating in the same is a piston 11, on the outer end of which is an enlarged piston 12 operating in a cylinder 13, and on the outer end of the cylinder 13 is secured a detachable cover 14 which encloses a strainer 15.

The cover 14 is provided with an annular groove 16 to receive the cider from the strainer, and communicating with the groove is a draw-off pipe 17. The strainer 15 is of ring formation and is provided with a series of narrow slots 18, through which the cider is strained to the groove 16.

19 is a valve formed with ports 20 and 21 for supplying oil to cylinder 10. Extending from the piston 12 is a lug 22 projecting through a slot 23 in the side of the cylinder 13.

Figure 2:
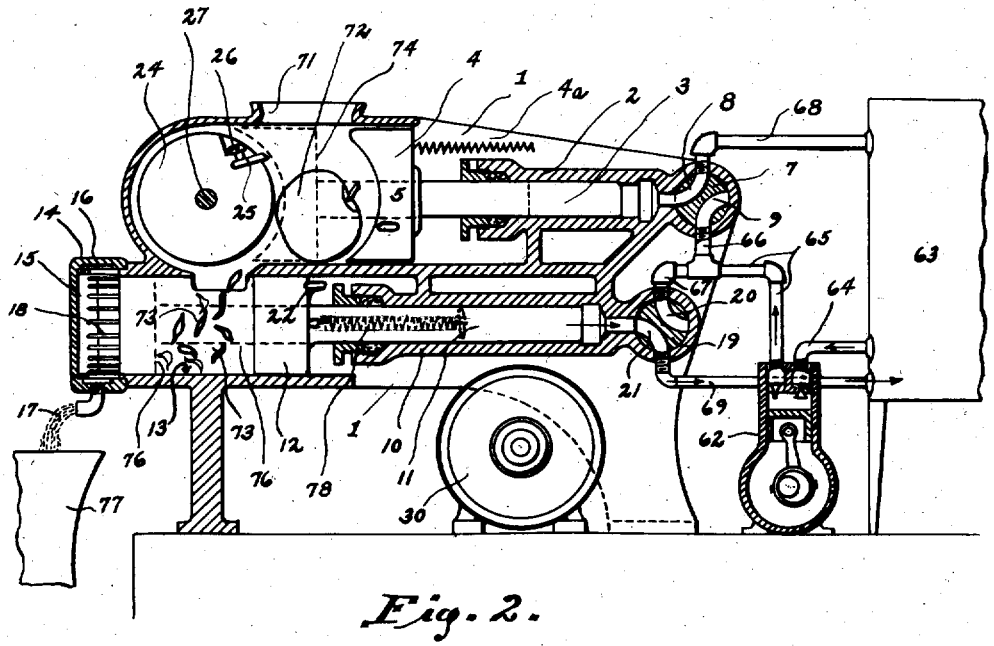
Figure 2 is a longitudinal section of the same.

Referring particularly to Figure 2, 24 indicates a rotor channeled out to receive a cutting blade 25 fastened in place by screws 26. The rotor is mounted on a shaft 27, to one end of which is keyed a grooved pulley 28, and a belt connects this pulley with another grooved pulley 29 on the shaft of a motor 30 located under the press. From one end of the valve 7 projects a stub shaft 31, to which is secured a bell crank 32 provided with a small hand lever 33. The valves 7 and 9 are held in place by end covers 34 and 35 by means of screws 36.

The bell crank 32 is connected to a rod 37, the outer end of this rod having a cam 38 formed with a notch 39 adapted to receive a lug 40 on the frame 1. Extending from one end of the valve 19 is a stub shaft 41, to which is secured ratchet wheel 42. Rotatably mounted on the stub shaft 41 are two levers 43 and 44. To lever 44 is pivoted a pawl 46, which cooperates with the ratchet wheel 42 in a manner to be described. A rod 47 connects the bell crank lever 32 with the lever 44 to cause simultaneous movement of the lever and bell crank when the hand lever is operated. To crank 43 is connected a rod 48 provided at its outer end with a cam 49 formed on its edge with a notch 50 adapted to receive a lug 51 on the frame of the press. Rods 37 and 48 pass through openings 52 and 53 formed in a bracket 54 on the side of the frame.

To rods 37 and 48 are secured collars 55 and 56, and to rod 37 is secured a forked lever 57, the lower forked end thereof straddling the rod 48 so that when rod 37 is moved to the left, rod 48 will be correspondingly moved. Between collars 55 and 56, and surrounding rods 37 and 48, are springs 58 and 59, the left hand ends of which bear against the bracket 54. 60 and 61 are two springs secured to bracket 54, and arranged so as to urge the rod 37 upwardly and the rod 38 downwardly to insure of the cams being in operative position to cooperate with the lugs 40 and 51.

62 is an oil pump and 63 is an oil reservoir. Oil pump 62 is connected on the suction side to the reservoir by means of a pipe 64, and the discharge side is connected to valves 7 and 19 by pipes 65, 66 and 67. 68 and 69 are discharge pipes connecting the valves 7 and 19 respectively to the oil reservoir 63. Pump 62 is belted to the motor 30 by means of belt 70.

Figure 6:
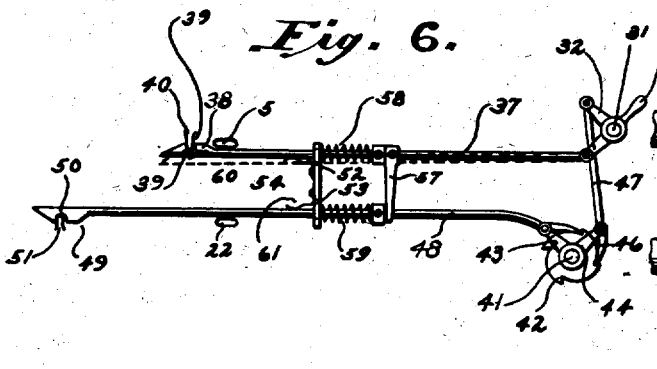
Figure 6 is a detail view illustrating the position of the levers when starting the press.

In operation, an apple, indicated at 72, is first dropped through the opening 71, as shown in Figure 2, then the hand lever 33 is moved from the position shown in Figure 1 to that shown in Figure 6. This moves the rod 37 to the left so that the notch 39 will engage the lug 40 and hold the parts in locked position. Movement of the rod 37, of course, moves the forked lever 57, and through the latter the rod 48 is moved a like distance and the notch 50 engages over the lug 51 and locks said rod in position.

Figure 7:
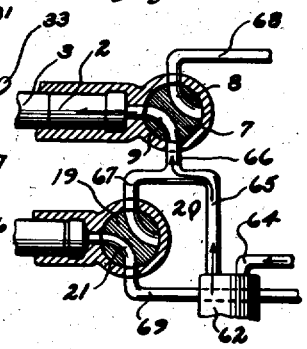
Figure 7 is a detail view illustrating the position of the valves when the levers are in the position shown in Figure 6.

Movement of the two rods 37 and 48, as described, will rotate valve 7 to the position shown in Figure 7, but because the levers 43 and 44 carrying the pawls freely rotate on the stub shaft 41, and the position and shape of the ratchet teeth, the valve 19 remains stationary. Hence this valve is in direct connection with the reservoir, as shown in Figure 7. Since valve 7 has been rotated to afford communication between the pump and cylinder 2, when the motor is started, oil is forced through pipes 65 and 66 and port 9 into the cylinder, and piston 3 is drawn forward. As the piston advances, the block 4 forces the apple against the rotor and the cutting blade cuts it into slices.

Figure 8:
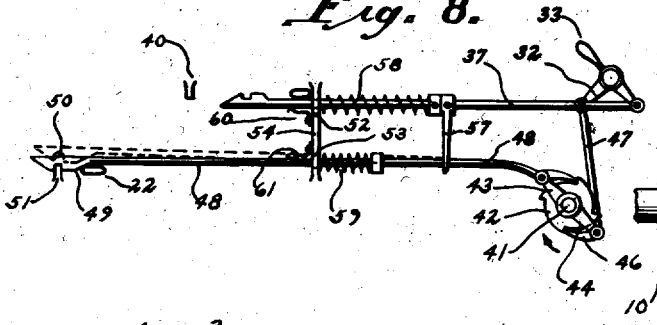
Figure 8 is a detail view illustrating the position of the levers at the beginning of the pressure stroke.
Figure 9:
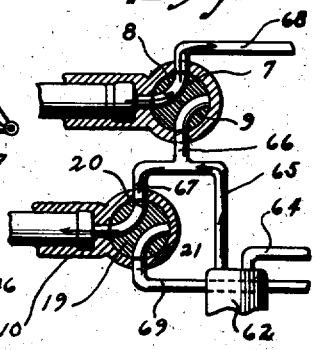
Figure 9 is a detail view illustrating the position of the valves when the levers are in the position shown in Figure 8.
Figure 3:
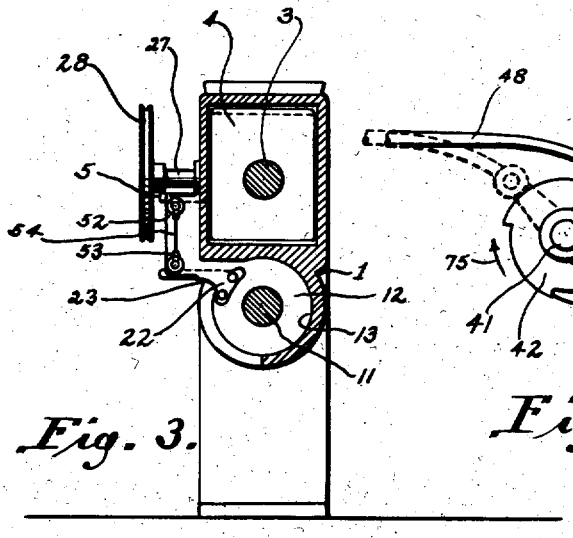
Figure 3 is a section on the line 3—3 of Figure 1.

The sliced pieces of apple fall into the cylinder 13, as shown at 73. When the block 4 has reached its limit of movement toward the extreme left, as indicated by dotted lines 74 in Figure 2, the lug 5 will ride up on the cam 38 of the rod 37, as shown in Figure 6, and force the rod down against the pressure of spring 60, as shown in dotted lines in Figure 6. This disengages the notch 39 from lug 40 and permits the spring 58 to return the rod 37 to its normal position, as shown in Figures 1 and 8, and correspondingly returns valve 7 to its normal position, as shown in Figure 9. When pressure is relieved from cylinder 2, a spring 4a will retract the piston 3 and force the oil back through port 8, pipe 68, to the reservoir. The movement of the bell crank 32 during this operation from position shown in Figure 6 to the position shown in Figure 8 causes rod 47 to move downwardly, which moves lever 44 downwardly, as shown in Figure 8, which causes the pawl 46 to rotate ratchet 42 in the direction indicated by arrow 75, which in turn causes the valve 19 to take the position as shown in Figure 9. This permits oil to pass from the pump through port 20 and into the cylinder 10, forcing the piston 11 with piston 12 to the left, as indicated by dotted lines 76 (Figure 2).

Figure 4:
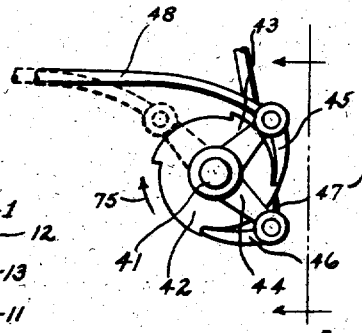
Figure 4 is an elevation of valve gear used in connection with the press.
Figure 5:
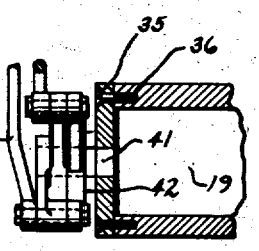
Figure 5 is an end view of the valve gear shown in Figure 4.
Figure 10:
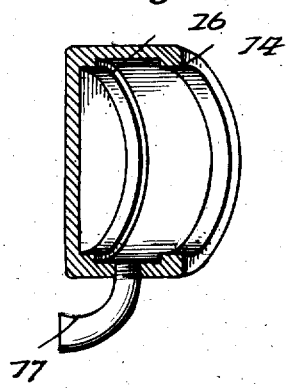
Figure 10 is a detail view of the strainer ring housing.
Figure 11:
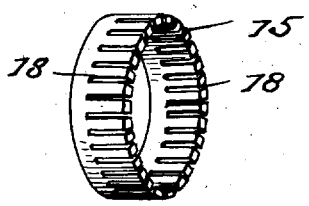
Figure 11 is a detail view of the strainer ring.

The sliced apple, indicated at 73, (Figure 2) is thus compressed against the detachable cover 14, forcing the apple juice or cider through slots 18 of the strainer into the annular groove 16, and finally out through draw-off pipe 17 into a glass or container 77 (Figures 1 and 2). As the piston 12 reaches its extreme movement toward the left, the lug 22 presses against the cam 49 (Figure 8), forcing rod 48 upwardly against the pressure of spring 61 to the position shown in the dotted lines, which disengages notch 50 from the lug 51, permitting the spring 59 to force rod 48 back to the right, as shown in Figures 1 and 4. This action causes pawl 45 to rotate ratchet 42 again in the direction of the arrow 75, causing valve 19 to assume the position shown in Figure 2. The spring 78 (Figure 2) retracts the piston 11, forcing the oil through port 21 back into reservoir 63. The machine having now reached the starting position, the motor is stopped. The strainer 15 is removed by lifting hook 14a to the position shown in dotted lines, permitting the cap 14 and strainer 18 to be removed and the pulp of the apple removed.

Figure 12:
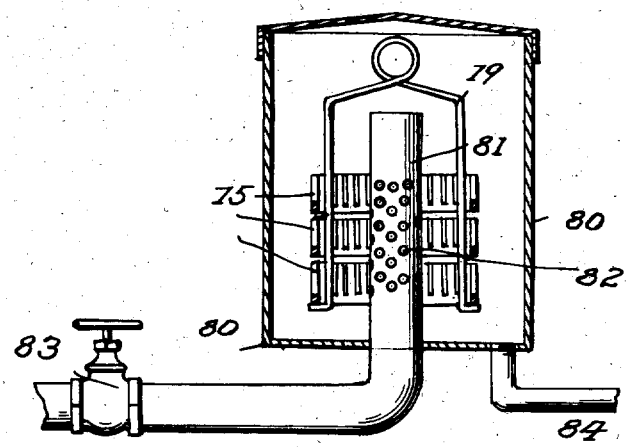
Figure 12 is a view illustrating the arrangement used for washing the strainer rings.

To clean the slots 18 of the strainer, any suitable method may be employed. For example, the strainers may be placed on a wire carrier 79, as shown in Figure 12, and lowered into a receptacle 80 provided with a pipe 81 perforated, as at 82. The steam or hot water may now be turned on by means of valve 83, allowing it to pass through holes 82 of pipe 80 against the strainers 15. The water, after having been rinsed through the strainers 15, passes off through the discharge pipe 84.

While I have shown and described a particular form of embodiment of my invention, I am aware that many minor changes will readily suggest themselves to those skilled in the art without departing from the spirit and scope of my invention. I, therefore, desire to avoid being limited to the particular form of embodiment which I have hereinabove shown and described.

I claim:

1. A press of the class described comprising a frame formed with a cavity to receive fruit, a rotating cutting blade for slicing the fruit into sections, a plunger to force the fruit into contact with the rotating cutting blade, a piston connected to the plunger, means for expressing the juice from the cut fruit including a piston, a valve for controlling fluid to the first mentioned piston, a second valve for controlling fluid to the second mentioned piston, means connected to the first mentioned valve for locking the valve in open position when admitting fluid to operate the first mentioned piston, a latch operated and set by the operation of the aforesaid means, a pawl and ratchet connection between said latch and the second mentioned valve, a second pawl cooperating with the ratchet, a connection between the first mentioned valve and the second mentioned pawl, a trip on the plunger for releasing the locked connecting means, means for returning said connecting means and the first mentioned valve to normal position, means operated by the second mentioned piston to automatically release the latch and cause the ratchet to open the second mentioned valve, and means for returning the juice expressing means to normal position.

2. A press of the class described comprising fruit slicing means, a plunger cooperating with said slicing means, a juice expressing plunger, a valve for admitting fluid to operate the first mentioned plunger, a bell crank lever connected to said valve, a latch rod connected to one arm of the bell crank lever, said latch rod having a cam formed with a notch, a lug on the first mentioned plunger to cooperate with the notch, a forked lever attached to the latch rod, a second valve for admitting fluid to the second mentioned plunger, a ratchet connected to said second mentioned valve, a pivoted lever cooperating with said second mentioned valve, a pawl pivoted to the latter lever and engaging the ratchet, a second latch rod pivoted to the pawl and lever, said second mentioned latch rod having a cam formed with a notch, the forked lever straddling said latter latch rod, a spring on each latch rod adjacent the forked lever, a second lever associated with the second mentioned valve, a pawl pivoted to said second mentioned lever and engaging the ratchet, a connection between said second mentioned lever and an arm of the bell crank lever, means on the first mentioned plunger to engage the cam and release the first mentioned latch rod, means on the second mentioned plunger to engage the cam and release the second mentioned latch rod, and means on each plunger to return same to normal position.

3. A press of the class described comprising a means for slicing fruit, means for expressing the juice from the sliced fruit, a pump, valves, means between the valves and the slicing and fruit juice expressing means to automatically lock one valve in open position to admit pressure from the pump to operate the slicing means and simultaneously set a latch to position a second valve to be subsequently operated to admit pressure from the pump to actuate the juice expressing means, means associated with the slicing means to shift the first mentioned valve to relieve the pressure from the pump and shift the second mentioned valve to admit pressure to operate the juice expressing means, and means associated with the juice expressing means for automatically releasing the mechanism to actuate the second mentioned valve to relieve pressure from the pump.

4. In combination, a macerating chamber, a macerator therein, moving means for feeding fruit to said macerator, a pressing chamber communicating with said macerating chamber, a pressing member within said pressing chamber adapted to compress the macerated material to remove the juice therefrom, said pressing member being arranged to cut off communication between said pressing chamber and said macerating chamber during the final stages of pressing, and control means operatively interconnecting said feeding member with said pressing member.

5. In combination, a macerating chamber, a macerator therein, a pressing chamber disposed adjacent to said macerating chamber and having a communicating passage therebetween, means for feeding fruit to said macerator within said macerating chamber, means for pressing the macerated fruit within said pressing chamber, and control means operatively interconnecting said feeding member with said pressing member.

6. In combination, a macerating chamber, a macerator therein, a pressing chamber disposed adjacent to said macerating chamber and having a communicating passage therebetween, means for feeding fruit to said macerator within said macerating chamber, means for pressing the macerated fruit within said pressing chamber, said pressing means being adapted to close said communicating passage prior to the completion of the pressing stroke, and control means operatively interconnecting said feeding member with said pressing member.

7. In combination, a macerating chamber, a macerator therein, a pressing chamber disposed adjacent to said macerating chamber and having a communicating passage therebetween, means for feeding fruit to said macerator within said macerating chamber, means for pressing the macerated fruit within said pressing chamber, and means for causing said pressing means to begin its operation substantially at the termination of the operation of said feeding means.

8. In combination, a macerating chamber, a macerator therein, a pressing chamber disposed adjacent to said macerating chamber and having a communicating passage therebetween, means for feeding fruit to said macerator within said macerating chamber, means for pressing the macerated fruit within said pressing chamber, straining means arranged near the end of said pressing chamber, and control means operatively interconnecting said feeding member with said pressing member.

9. In combination in a juice-extracting machine, a hydraulically-operated feeding member, a macerator arranged to be fed by said feeding member, a hydraulically-operated fruit-pressing member, a source of fluid pressure for supplying said members, and means operatively connected to said fruit-feeding member to delay the operation of said fruit-pressing member until said fruit-feeding member reaches a predetermined position.

10. In combination in a juice-extracting machine, a hydraulically-operated fruit-feeding member, a macerator arranged to be fed by said feeding member, a hydraulically-operated fruit-pressing member, a source of fluid pressure for supplying said members, valve means arranged to control the supplying of pressure fluid to said feeding and pressing members, and mechanism operatively interconnecting said valve means, said mechanism being adapted to operate said pressing member valve to supply fluid thereto when said feeding member reaches a predetermined position.

11. In combination in a juice-extracting machine, a hydraulically-operated feeding member, a macerator arranged to be fed by said feeding member, a hydraulically-operated fruit-pressing member, a source of fluid pressure for supplying said members, means operatively connected to said fruit-feeding member to delay the operation of said fruit-pressing member until said fruit-feeding member reaches a predetermined position, and means adapted to halt the supplying of pressure fluid to said pressing member when said pressing member approaches the end of its pressing stroke.

12. In combination in a juice-extracting machine, a hydraulically-operated fruit-feeding member, a macerator arranged to be fed by said feeding member, a hydraulically-operated fruit-pressing member, a source of fluid pressure for supplying said members, valve means arranged to control the supplying of pressure fluid to said feeding and pressing members, mechanism operatively interconnecting said valve means, said mechanism being adapted to operate said pressing member valve to supply fluid thereto when said feeding member reaches a predetermined position, and means adapted to halt the supplying of pressure fluid to said pressing member when said pressing member approaches the end of its pressing stroke.

BRUCE L. McKINSTRY.